Oct. 8, 1957
R. M. GILE
2,808,760
SLIDE PROJECTORS
Filed Oct. 30, 1953
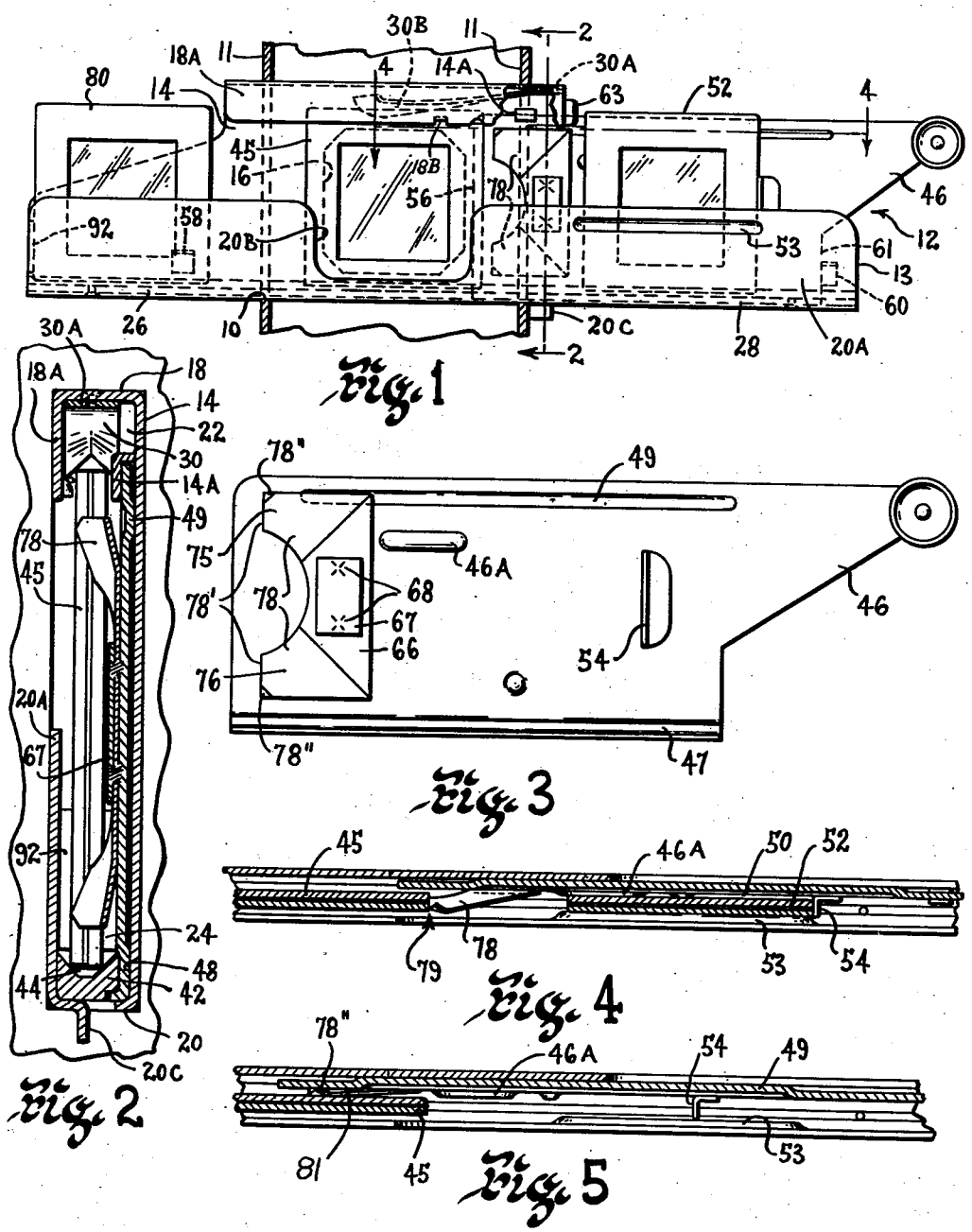
INVENTOR
RICHARD M. GILE.
BY Louis L. Gagnon
Noble S. Williams
ATTORNEYS United States Patent Office 2,808,760
Patented Oct. 8, 1957

2,808,760

SLIDE PROJECTORS

Richard M. Gile, Peabody, Mass., assignor to American Optical Company, Southbridge, Mass., a voluntary association of Massachusetts Application October 30, 1953, Serial No. 389,449

5 Claims. (Cl. 88—28)

This invention relates to slide changers for use with projection apparatus and the like; and more particularly relates to improvements in slide changers of the push-through type constructed and arranged to move successive slides or transparencies of various conventional thicknesses into a projection position in said projection apparatus, to properly center same at said projection position and to remove same from said projection position readily and quietly. The improved construction and arrangement provides a structure which is sturdy, convenient to operate and efficient and which may be made and assembled rapidly and economically.

While push-through type slide changers are not new, certain of the slide changers of earlier construction have been inconvenient to operate, expensive to make and assemble, and have failed to properly insert, center and remove successive slides of various thicknesses easily, accurately and quietly relative to the projection position and focal plane of the projection apparatus.

The proper and exact positioning of each successive slide of a group of slides of small sizes and of various thicknesses in a predetermined plane in slide projectors is of real importance since such projectors are intended to provide images of comparatively high magnifications and generally employ objectives of comparatively short and thus critical focal lengths. Furthermore, in such a projector it is desirable that all slides of a collection of slides, including the "last slide," be removed from the projection position in the apparatus without difficulty and without requiring the use of a special tool or the like. In fact, heretofore it has not been uncommon with push-through slide changers to provide an "extra" slide intended exclusively or primarily for use in pushing out the last slide in the apparatus to an exposed position. The push-through slide changer of the present invention requires no such extra slide or equivalent tool but is completely self-contained, being a unitary assembly comprising relatively few parts which may be easily manufactured and readily assembled and which will thereafter automatically position and center successive transparent slides at a predetermined focal plane and projection aperture in the apparatus.

It is accordingly an objective of the present invention to provide for use with a slide projector or the like a readily insertable unitary push-through type slide changer assembly of such a construction and arrangement that it will automatically accurately position and center successive conventional slides of varying thicknesses at the projection aperture of the projector and will readily remove each of such slides from the projection apparatus thereafter, said slide changer assembly being of a sturdy and inexpensive construction, convenient and quiet during use, and of compact size when removed from the projector.

Other objects and advantages of the invention will become apparent from the detailed description which follows when taken in conjunction with the accompanying drawing, in which:

Fig. 1 is a side elevational view of a slide changer embodying the present invention and shown positioned transversely within a projector housing;

Fig. 2 is a vertical sectional view taken substantially on line 2—2 of Fig. 1 and looking in the direction of the arrows;

Fig. 3 is a side elevational view of a slide pusher of the type employed in the slide changer of Fig. 1;

Fig. 4 is a fragmentary horizontal sectional view taken upon section line 4—4 of Fig. 1 and looking in the direction of the arrows; and Fig. 5 is a fragmentary sectional view much like that of Fig. 4 but showing certain parts thereof in a different operative position.

It is common practice to provide in the opposite side walls of a slide projector at the present time a pair of transversely aligned vertically disposed generally rectangular openings for accommodating a readily insertable and removable slide changer assembly. A preferred construction of the slide changer assembly of the present invention is intended for use in such a projector, and accordingly, a pair of transversely aligned openings 10 are shown in the spaced side walls 11 in a slide projector, in Fig. 1, for receiving a readily removable slide changer 12 therein. It will be readily seen that the slide changer assembly 12 comprises a main supporting frame 13 which is preferably formed of a relatively thin single piece of sheet material, such as sheet metal, having a main vertically disposed plate-like body portion 14 (provided with a projection aperture 16 centrally therein), an upper bent-over horizontal wall portion 18 and a lower bent-over horizontal wall portion 20. The horizontal portions 18 and 20 are arranged in vertically spaced facing relation to each other and provided with integral vertically extending elongated flange portions 18A and 20A, respectively, so as to enclose and provide an upper guideway 22 and a lower guideway 24 of somewhat longer length therein.

The guideway or channel 22 is of a sufficient width and depth to accommodate a slide-centering and retaining cantilever leaf spring 30 having one end portion 30A thereof riveted, spot-welded or otherwise secured to the horizontal portion 18. This spring has its opposite end portion 30B shaped to provide a transversely extending V-groove portion facing downwardly so as to accommodate the upper edge of a slide or transparency when positioned in the assembly and moved into the projector for projection in a manner presently to be described. The lower horizontal portion 20 and flange portion 20A providing the guideway or channel 24 are of considerably greater length than the upper portions 18 and 18A to provide the main supporting frame 13 with lateral extensions 26 and 28 located outwardly of the opposite side walls of the projector.

In the lower guideway or channel 24 there is provided, as best seen in Fig. 2, an elongated bar-like member 42 riveted, spot-welded or otherwise secured to the horizontal portion 20 and this bar-like member has provided in its upper surface a V-shaped groove 44 located therein so as to have its central portion disposed directly below the V-shaped groove provided in the end portion 30B of the cantilever spring. Thus it will be seen that when the removable slide carrier assembly 12 is positioned within the projector and a locating stop, such as the stop 20C struck outwardly from the portion 20, is brought into contact with the side wall 11 for locating the assembly relative to the projector, the projection aperture 16 will be in optical alignment and the upper and lower V-shaped grooves will maintain a slide or transparency aligned with said projection aperture and the film or picture containing portion thereof substantially in a single predetermined vertical, transverse plane notwithstanding the fact that different slides of conventional construction, often contained within a collection of transparencies, may have different thicknesses depending upon the mounting materials of which they are made. An inwardly extending short finger 18B serves to limit downward movement of the spring 30.

In order that slides or transparencies may be conveniently and successively moved into the projection position, being occupied by slide 45 in Fig. 1 in alignment with aperture 16, there is provided an elongated plate-like vertically disposed pusher member 46. The member 46 has a relatively small channel shaped flange portion 47 (see Fig. 3) formed along its lower edge and arranged to fit within an L-shaped groove 48 provided between the bar-like member 42 and plate-like body portion 14 when the pusher is in position in the assembly. At this time the pusher member 46 will have its upper edge disposed between the plate-like body portion 14 and a struck-out and bent over finger portion 14A. In this manner the pusher member 46 will be retained closely adjacent the body portion 14 for all positions of adjustment and will have its upper edge pass between the cantilever spring and the plate-like portion 14 when moved inwardly transversely of the projector. The major part of the pusher 46, however, will be kept spaced slightly from body portion 14 by a pressed rib 49 and by said pressed channel shaped portion 47 thereof.

The vertical disposed flange 20A of the main body portion 14 is of appreciable height, except for a recessed area 20B formed centrally therein to accommodate the projector light beam being directed through the projection aperture 16, and thus a pocket 50 will be formed between the flange 20A and the main body portion 14 for loosely receiving a slide, indicated at 52, at the entrance side of the projector and outwardly of the projector proper with the lower edge of the slide, at such time, resting in the V-shaped groove 44 formed in the upper surface of the bar-like member 42. An inwardly pressed rib 53 in portion 20A helps to maintain the slide generally vertically in this initial position. There is provided on the pusher member 46 an abutment 54 which may be conveniently formed by striking or bending out a portion of the pusher member 46 during the stamping or forming thereof and this abutment 54 serves as means for pushing each successive slide in the pocket 50 inwardly towards the projection position adjacent aperture 16.

The location of the struck-out abutment 54 and the length of the pusher member bear such relation to the main supporting frame 13 of the slide changer assembly that the slide 52 being moved inwardly by the pusher 46 will be properly positioned adjacent the projection aperture 16 at the time the leading edge 56 of the pusher engages a bent over stop 58 formed integral with the main body portion 14 (Fig. 1). Movement of the pusher 46 in the opposite direction will be limited by a second stop 60 disposed at the opposite end of the main supporting frame 13 of the slide changer and formed integrally with the main body portion 14 so as to abut an edge 61 on the pusher.

As a slide is moved inwardly from the receiving pocket 50 by the pusher, its lower edge will rest in and will be centered by the V-shaped groove 44. Its upper edge will be directed into the guideway 22 by a flared out wing 63 on the flange portion 18A. A pressed rib 46A on the pusher 46 helps maintain the loose slide vertically at this time. Thus, the upper inner corner of the slide 52 entering the projector will be in line with the centering spring 30 and will have camming engagement with the spring so as to ride into the inverted V-shaped groove portion therein and be maintained in said predetermined plane mentioned previously. While each successive slide is being positioned in the pocket 50, it is "free" therein and accordingly no jar to the slide being projected by the instrument will normally occur. On the other hand when the slide is at the projection aperture, such as the slide 45, it will be firmly gripped and maintained centered in its vertical position between the V-shaped grooves previously mentioned.

Positioned upon the pusher 46 and in a location forwardly or inwardly of the slide in pocket 50 is an ejector 66 formed by a relatively thin or light gauge resilient sheet material spot-welded or otherwise secured to the pusher 46. Because the material of ejector 66 is of such light gauge and is spot welded in the showing in Fig. 3 a reinforcing plate 67 is used at the welded areas 68. The upper and lower inner corner portions 75 and 76 of the ejector, it will be noted, are bent outwardly slightly relative to the attached portion of this ejector member 66 in such a manner as to provide wings 78 presenting forward edges 78' for engaging the rear edge of any slide positioned at the projection aperture, such as indicated at 79 in Fig. 4. Thus continued inward or transverse movement of the pusher member 46 will cause the slide at the projection aperture 16 to be engaged and moved toward the exit side of the projector and into the position occupied by slide 80 in Fig. 1, convenient for removal by the operator.

The lightweight resilient material of which the ejector member 66 is formed is of such thin gauge and resilient character that the wings 78 thereof will readily flex, as indicated at 81 in Fig. 5, inwardly toward the pusher member 46 as the pusher member is being drawn back toward its initial position and as the wing portions 78 slide by the side of the slide 45 positioned at the projection aperture 16. It will be noted also that the only contact that these wing portions 78 have with the slide 45 at the aperture 16 as they move by same during their return travel is at points adjacent their upper and lower bent out corners 78" and thus at points well removed from the picture carrying or film portions of the individual slides or transparencies. The spring pressure provided by the cantilever leaf spring 30, it will be readily appreciated, is of sufficient magnitude to maintain the slide 45 stationary at the projection aperture 16 as the pusher member 46, ejector 66 and wings 78 are moved back to their initial slide receiving position.

Thus a push-through slide changer of comparatively simple construction and formed of a comparatively few inexpensive and easily formed parts is provided, and in which each successive slide to be projected is properly positioned and automatically centered at the projection aperture, the structure being such that all slides including the last slide may be easily and readily ejected or moved out of the projection position into a position convenient for removal from the slide changer automatically. If desired a stop 92 may be provided at the end of the lower guideway 44 to prevent a slide, such as slide 80, from being pushed off the end of the guideway by a slide following thereafter.

I claim:

1. A push-through type slide changer assembly for use with a slide projector or the like, said assembly comprising a main supporting frame having a projection aperture located therein and having a pair of lateral extensions located at opposite sides of said aperture, said main supporting frame being adapted to be disposed transversely in said slide projector with said projection aperture in alignment with the optical system of said projector, and with said extensions projecting outwardly from opposite sides of said projector, said main supporting frame having parts thereof shaped to provide upper and lower guideways therein, a yieldable member and a fixed member having V-shaped grooves formed therein and located in said main supporting frame in vertically opposed facing relation to each other above and below said projection aperture, for receiving and gripping opposite edge portions of each successive slide of a plurality of slides of a predetermined size but varying thicknesses and for maintaining each slide when so gripped with the photographic film portion thereof substantially in a predetermined vertical plane in said assembly, a pusher member slidably carried in said main supporting frame and having a first means thereon for engaging a slide when positioned in one of said lateral extensions outwardly of said projector and moving same into said projector and into optical alignment with the optical system thereof, and a second means on said pusher member arranged to engage a slide when disposed adjacent said projection aperture as said pusher member is moved inwardly and move same out of said projector.

2. A push-through type slide changer assembly for use with a slide projector, or the like, said assembly comprising a main supporting frame having a projection aperture located therein and having a pair of lateral extensions located at opposite sides of said aperture, said main supporting frame being adapted to be disposed transversely in said slide projector with said projection aperture in alignment with the optical system of said projector, and with said extensions projecting outwardly from opposite sides of said projector, said main supporting frame having parts thereof shaped to provide upper and lower guideways therein, a yieldable member and a fixed member having V-shaped grooves formed therein and located in said main supporting frame in vertically opposed facing relation to each other above and below said projection aperture, for receiving and gripping opposite edge portions of each successive slide of a plurality of slides of a predetermined size but varying thicknesses and for maintaining each slide when so gripped with the photographic film portion thereof substantially in a predetermined vertical plane in said assembly, a pusher member slidably carried in said main supporting frame and having a first means thereon for engaging a slide when positioned in one of said lateral extensions outwardly of said projector and moving same into said projector and into optical alignment with the optical system thereof, and a second means on said pusher member arranged to engage a slide when disposed adjacent said projection aperture as said pusher member is moved inwardly and move same out of said projector, said second means on said pusher member being in the form of a yieldable element arranged to move into a retracted position as the pusher member is returned to its initial position without disturbing any slide located at said projection aperture.

3. A push-through type slide changer assembly for use with a slide projector or the like, said assembly comprising a main supporting frame formed of a single piece of sheet metal and comprising a vertically disposed main body portion having a projection aperture located therein, upper and lower portions of said main supporting frame being bent to extend horizontally from said main body portion and having vertically disposed flange portions at their free edges extending toward each other so as to provide upper and lower guideways therein, the lower part of said main supporting frame being of greater length than the upper part thereof thereby providing a pair of lateral extensions having slide accommodating pockets therein located at opposite sides of said aperture, said main supporting frame being adapted to be disposed transversely in said slide projector with said projection aperture in alignment with the optical system of said projector and with said extensions projecting outwardly from opposite sides of said projector, a yieldable member and a fixed member having V-shaped grooves formed therein and located in said main supporting frame in vertically opposed facing relation to each other above and below said projection aperture, for receiving and gripping opposite edge portions of each successive slide of a plurality of slides of a predetermined size but varying thicknesses and for maintaining each slide when so gripped with the photographic film portion thereof substantially in a predetermined vertical plane in said assembly, a pusher member slidably carried in said main supporting frame between said main body portion and said flange portions and having a first means thereon for engaging a slide when the pusher is in its outer position and the slide is positioned in the lateral extensions adjacent thereto and moving same into said projector and into optical alignment with the optical system thereof, and a second means on said pusher member arranged to engage a slide when disposed adjacent said projection aperture as said pusher member is moved inwardly from its outer position and move said last mentioned slide into the pocket in the lateral extension at the opposite side of said projector.

4. A push-through type slide changer assembly for use with a slide projector, or the like, said assembly comprising a main supporting frame having a projection aperture located therein and having a pair of lateral extensions located at opposite sides of said aperture, said main supporting frame being adapted to be disposed transversely in said slide projector with said projection aperture in alignment with the optical system of said projector, and with said extensions projecting outwardly from opposite sides of said projector, said main supporting frame having parts thereof shaped to provide upper and lower guideways therein, a yieldable member and a fixed member having V-shaped grooves formed therein and located in said main supporting frame in vertically opposed facing relation to each other above and below said projection aperture, for receiving and gripping opposite edge portions of each successive slide of a plurality of slides of a predetermined size but varying thicknesses and for maintaining each slide when so gripped with the photographic film portion thereof substantially in a predetermined vertical plane in said assembly, a pusher member slidably carried in said main supporting frame and having a first means thereon for engaging a slide when the pusher is in its outer position and said slide is positioned in the lateral extension adjacent thereto and moving same into said projector and into optical alignment with the optical system thereof, and a second means on said pusher member inwardly of said slide and said first means, said second means being arranged to engage a second slide disposed adjacent said projection aperture as said pusher member is moved inwardly and to move said second slide into the other lateral extension outwardly of said projector, said second means on said pusher member being in the form of a yieldable element arranged to be moved into a retracted position out of contact with the film portion of any slide at said projection aperture as the pusher member is returned to its initial outer position.

5. A push-through type slide changer assembly for use with a slide projector, or the like, said assembly comprising a main supporting frame having a projection aperture located therein and having a pair of lateral extensions located at opposite sides of said aperture, said main supporting frame being adapted to be disposed transversely in said slide projector with said projection aperture in alignment with the optical system of said projector, and with said extensions projecting outwardly from opposite sides of said projector, said main supporting frame having parts thereof shaped to provide upper and lower guideways therein, a yieldable member and a fixed member having V-shaped grooves formed therein and located in said main supporting frame in vertically opposed facing relation to each other above and below said projection aperture, for receiving and gripping opposite edge portions of each successive slide of a plurality of slides of a predetermined size but varying thicknesses and for maintaining each slide when so gripped with the photographic film portion thereof substantially in a predetermined vertical plane in said assembly, a pusher member slidably carried in said main supporting frame and having a fixed projection thereon for engaging a slide in one of said lateral extensions as the pusher member is moved inwardly, and for moving same into said projector and into optical alignment with the optical system thereof, and a relatively thin flexible arm on said pusher member having an abutment portion thereon arranged to engage a second slide when disposed adjacent said projection aperture as said pusher member is moved inwardly and to move same out of said projector, said flexible arm on said pusher member being arranged to be moved into a retracted position out of contact with the film portion of any slide at said projection aperture as the pusher member is returned to its initial outer position.

References Cited in the file of this patent

UNITED STATES PATENTS

| | | |
|---|---|---|
| 952,199 | James | Mar. 15, 1910 |
| 2,213,779 | Young | Sept. 3, 1940 |
| 2,298,369 | Greaves | Oct. 13, 1942 |
| 2,298,413 | Reid | Oct. 13, 1942 |
| 2,496,724 | Host | Feb. 7, 1950 |
| 2,522,760 | Lowber et al. | Sept. 19, 1950 |
| 2,543,520 | Bradford et al. | Feb. 27, 1951 |
| 2,634,653 | Barth | Apr. 14, 1953 |